US008881933B2

(12) United States Patent
Green

(10) Patent No.: US 8,881,933 B2
(45) Date of Patent: Nov. 11, 2014

(54) VEHICLE MOUNTING ASSEMBLY FOR A FUEL SUPPLY

(76) Inventor: Jason E. Green, Davie, FL (US)

( * ) Notice: Subject to any disclaimer, the term of this patent is extended or adjusted under 35 U.S.C. 154(b) by 517 days.

(21) Appl. No.: 13/274,625

(22) Filed: Oct. 17, 2011

(65) Prior Publication Data

US 2013/0092694 A1    Apr. 18, 2013

(51) Int. Cl.
*B65D 1/42* (2006.01)
*B65D 90/14* (2006.01)

(52) U.S. Cl.
CPC .................................. *B65D 90/146* (2013.01)
USPC ........... 220/629; 220/636; 220/635; 220/605; 248/440.1

(58) Field of Classification Search
CPC ....... B65D 90/146; B65D 90/12; B65D 90/14
USPC ................. 220/628, 636, 635, 694, 605, 629; 248/163.1, 440.1, 649, 151, 164, 431, 248/168, 170
See application file for complete search history.

(56) References Cited

U.S. PATENT DOCUMENTS

| | | |
|---|---|---|
| 3,866,781 A | 2/1975 | Stedman et al. |
| 4,006,852 A | 2/1977 | Pilsner et al. |
| 4,078,629 A | 3/1978 | Kutay et al. |
| 4,288,086 A | 9/1981 | Oban et al. |
| 4,335,697 A | 6/1982 | McLean |
| 4,415,051 A | 11/1983 | Taylor |
| 4,442,665 A | 4/1984 | Fick et al. |
| 4,489,699 A | 12/1984 | Poehlman |
| 4,522,159 A | 6/1985 | Engel et al. |
| 4,527,516 A | 7/1985 | Foster |
| 4,535,728 A | 8/1985 | Batchelor |
| 4,603,674 A | 8/1986 | Tanaka |
| 4,606,322 A | 8/1986 | Reid et al. |
| 4,617,904 A | 10/1986 | Pagdin |

(Continued)

FOREIGN PATENT DOCUMENTS

| | | |
|---|---|---|
| WO | WO 02101214 | 12/2002 |
| WO | WO 2008/037175 A1 | 4/2008 |

(Continued)

OTHER PUBLICATIONS

GFS Corp., 'First LNG Mining Truck in U.S.' [online press release], Oct. 21, 2010, Retrieved from the internet on Oct. 25, 2012: http://www.d2ginc.com/PDF/First%20LNG%20Mining%20Truck%20US%20Press%20Kit%20Oct%2021.pdf.

(Continued)

*Primary Examiner* — Robert J Hicks
*Assistant Examiner* — Kareen Rush
(74) *Attorney, Agent, or Firm* — Malloy & Malloy, P.L.

(57) ABSTRACT

A mounting assembly for supporting a fuel supply on a vehicle, which is adapted for operable support and positioning of an auxiliary fuel supply. The vehicle may vary significantly, but is primarily structured for use on mine haul vehicles, bulldozers, and other heavy duty vehicles, wherein the operation thereof is enhanced through the provision of an auxiliary, or alternate fuel supply such as, but not limited to, liquid natural gas (LNG), selectively powering the engine as determined by an improved electronic control system. The mounting assembly comprises a containment structure including at least one fuel tank and a housing structured to enclose the fuel tank. A base supports both the housing and the fuel tank and a shield assembly protects the fuel tank against impact in the working environment of the vehicle.

25 Claims, 8 Drawing Sheets

(56) References Cited

U.S. PATENT DOCUMENTS

| | | |
|---|---|---|
| 4,641,625 A | 2/1987 | Smith |
| 4,708,094 A | 11/1987 | Helmich et al. |
| 4,770,428 A | 9/1988 | Sugiyama |
| 4,799,565 A | 1/1989 | Handa et al. |
| 4,817,568 A | 4/1989 | Bedford |
| 4,861,096 A | 8/1989 | Hastings |
| 4,955,326 A | 9/1990 | Helmich |
| 5,033,567 A | 7/1991 | Washburn et al. |
| 5,050,550 A | 9/1991 | Gao |
| 5,092,305 A | 3/1992 | King |
| 5,156,230 A | 10/1992 | Washburn |
| 5,215,157 A | 6/1993 | Teich |
| 5,224,457 A | 7/1993 | Arsenault et al. |
| 5,355,854 A | 10/1994 | Aubee |
| 5,370,097 A | 12/1994 | Davis |
| 5,379,740 A | 1/1995 | Moore et al. |
| 5,518,272 A | 5/1996 | Fukagawa et al. |
| 5,526,786 A | 6/1996 | Beck et al. |
| 5,546,908 A | 8/1996 | Stokes |
| 5,566,653 A | 10/1996 | Feuling |
| 5,593,167 A | 1/1997 | Barnhardt et al. |
| 5,701,928 A | 12/1997 | Aoki |
| 5,735,253 A | 4/1998 | Perotto et al. |
| 5,794,979 A | 8/1998 | Kasuga et al. |
| 5,810,309 A | 9/1998 | Augustine et al. |
| 5,845,940 A | 12/1998 | Colburn |
| 5,937,800 A | 8/1999 | Brown et al. |
| 6,003,478 A | 12/1999 | Huber |
| 6,041,762 A | 3/2000 | Sirosh et al. |
| 6,101,986 A | 8/2000 | Brown et al. |
| 6,168,229 B1 | 1/2001 | Kooi et al. |
| 6,250,260 B1 | 6/2001 | Green |
| 6,289,881 B1 | 9/2001 | Klopp |
| 6,543,395 B2 | 4/2003 | Green |
| 6,550,811 B1 | 4/2003 | Bennett |
| 6,676,163 B2 | 1/2004 | Joitescu et al. |
| 6,718,952 B2 | 4/2004 | Finch |
| 6,751,835 B2 | 6/2004 | Fenton |
| 6,875,258 B2 | 4/2005 | Kuperus |
| 6,938,928 B2 | 9/2005 | Pfohl et al. |
| 7,019,826 B2 | 3/2006 | Vook et al. |
| 7,270,209 B2 | 9/2007 | Suess |
| 7,334,818 B2 | 2/2008 | Mascarenhas et al. |
| 7,341,164 B2 * | 3/2008 | Barquist et al. ............ 220/629 |
| 7,607,630 B2 * | 10/2009 | Jung et al. .................. 248/440.1 |
| 7,775,311 B1 | 8/2010 | Hardy et al. |
| 7,874,451 B2 * | 1/2011 | Bel ............... 220/628 |
| 7,976,067 B2 | 7/2011 | Naganuma et al. |
| 8,005,603 B2 | 8/2011 | Fisher et al. |
| 8,282,132 B2 | 10/2012 | Griesbaum |
| 8,498,799 B2 | 7/2013 | Matthews, Jr. et al. |
| 8,534,403 B2 | 9/2013 | Pursifull |
| 8,550,274 B2 * | 10/2013 | Gerding ............... 220/1.5 |
| 8,556,107 B2 * | 10/2013 | McRobbie et al. ...... 220/495.06 |
| 2001/0037549 A1 | 11/2001 | Fenton |
| 2002/0017088 A1 | 2/2002 | Dillon |
| 2002/0029770 A1 | 3/2002 | Heffel et al. |
| 2002/0030397 A1 | 3/2002 | Tamura et al. |
| 2002/0078918 A1 | 6/2002 | Ancimer et al. |
| 2003/0178422 A1 | 9/2003 | Kosuge et al. |
| 2004/0140412 A1 * | 7/2004 | Hendzel et al. ............. 248/440 |
| 2004/0148086 A1 | 7/2004 | Tafazoli et al. |
| 2005/0121005 A1 | 6/2005 | Edwards |
| 2006/0033322 A1 | 2/2006 | Suess |
| 2008/0023957 A1 | 1/2008 | Diehl |
| 2009/0320786 A1 | 12/2009 | Fisher |
| 2010/0045017 A1 | 2/2010 | Rea |
| 2010/0078244 A1 | 4/2010 | Pursifull |
| 2010/0127002 A1 * | 5/2010 | Bel ............... 220/629 |
| 2012/0001743 A1 | 1/2012 | Cotten et al. |
| 2012/0060800 A1 | 3/2012 | Green |
| 2012/0067660 A1 | 3/2012 | Kashu et al. |
| 2012/0325355 A1 | 12/2012 | Docheff |
| 2013/0068905 A1 | 3/2013 | Green |
| 2013/0069357 A1 | 3/2013 | Green |
| 2013/0074816 A1 | 3/2013 | Green |
| 2013/0112768 A1 | 5/2013 | Hagenbuch |
| 2013/0245864 A1 | 9/2013 | Frazier et al. |
| 2014/0053800 A1 | 2/2014 | Steffen et al. |

FOREIGN PATENT DOCUMENTS

| | | |
|---|---|---|
| WO | WO 2012/036768 A1 | 3/2012 |
| WO | WO 2013/039708 A1 | 3/2013 |
| WO | WO 2013/048812 A1 | 4/2013 |
| WO | WO 2013/058988 A2 | 4/2013 |

OTHER PUBLICATIONS

Caterpillar 785C Mining Truck Spec Sheet, 2010.

* cited by examiner

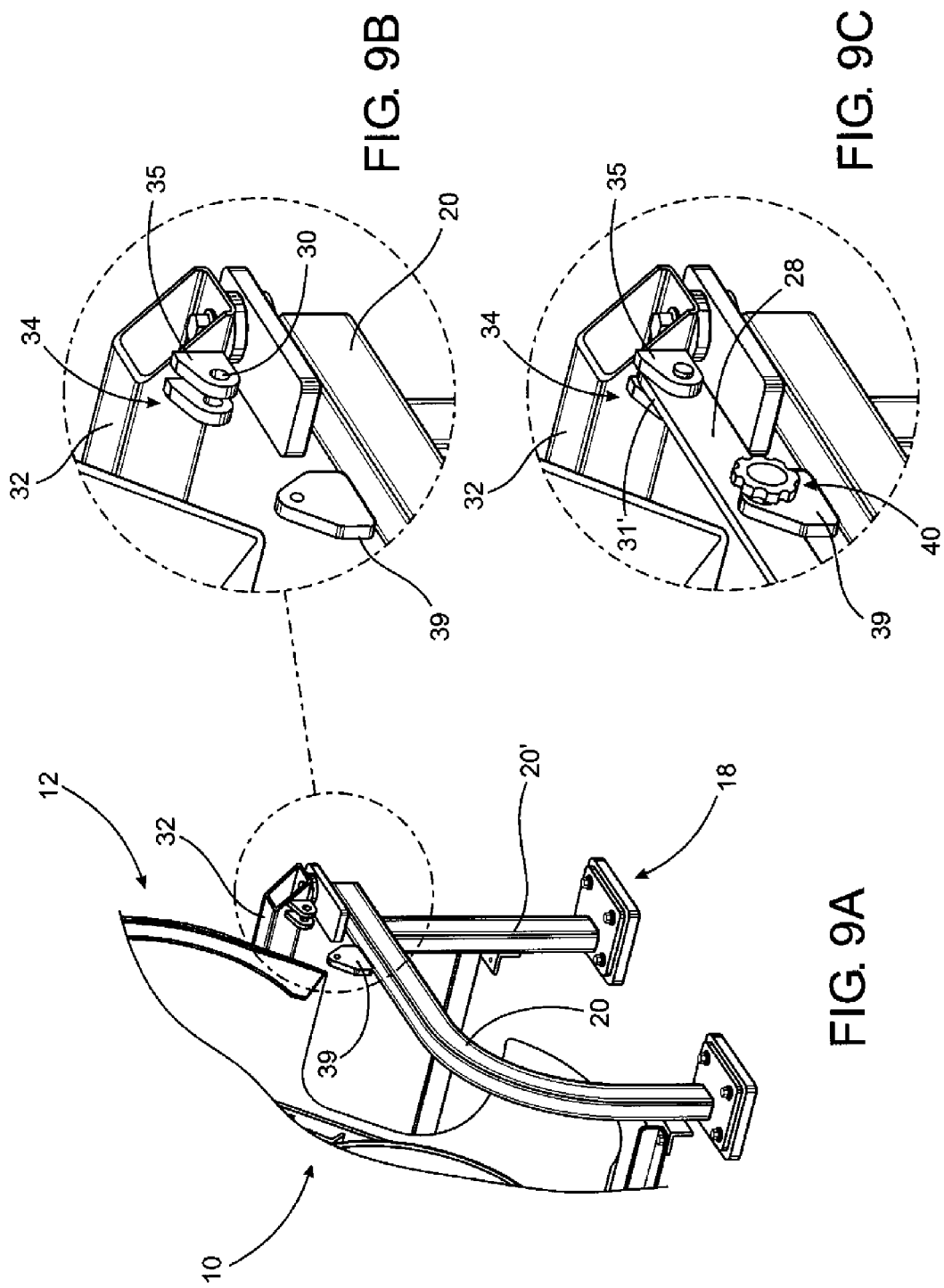

VEHICLE MOUNTING ASSEMBLY FOR A FUEL SUPPLY

BACKGROUND OF THE INVENTION

1. Field of the Invention

This invention is directed to a mounting assembly for supporting an auxiliary or primary fuel supply on a vehicle such as, but not limited to, mine haul vehicles, bulldozers, and other heavy duty commercial vehicles. As such, the operation of the vehicle with which the mounting assembly is used may be significantly enhanced through the provision of an auxiliary or selectively alternate fuel supply, dependent at least in part on the operating mode and characteristics of the vehicle. Moreover, the alternate fuel may be liquid natural gas (LNG).

2. Description of the Related Art

Mine haul trucks are off-highway, two axle, rigid dump trucks, specifically engineered for use in high production mining and heavy duty construction environments. As such, haul truck capacities typically range from 50 short tons (45 tons) to 400 short tons (363 tons). In addition, the largest and highest payload capacity of such haul trucks are referred to as "ultra class" trucks. This ultra class includes haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included secondary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

In addition, the operation of such a fuel control system would be facilitated by the inclusion of a preferred mounting assembly for the alternate fuel supply. As such, the included and preferred mounting assembly would be readily adaptive for use on different vehicles while facilitating the secure, safe and efficient distribution of the alternate fuel in the intended manner.

SUMMARY OF THE INVENTION

This invention is directed to mounting assembly operative to support an alternate fuel supply on a vehicle, wherein the fuel supply may be used with an improved fuel control system. The fuel control system comprises technology that allows for the safe and efficient use of a gaseous fuel such as, but not limited to, liquid natural gas (LNG), in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes; be either a predetermined combination of gaseous fuel and distillate fuel or substantially entirely distillate fuel, absent any contribution of gaseous fuel.

At least one preferred embodiment of the present invention is directed to a mounting assembly for supporting a fuel supply on a vehicle. While the mounting assembly is specifically adapted for the operable support and positioning of an auxiliary fuel supply, it is also structurally and operationally capable of mounting and/or supporting a primary fuel supply. In addition, the vehicle with which the mounting assembly of the present invention is utilized may vary significantly, but is primarily structured for use on mine haul vehicles, bulldozers, and other heavy duty commercial vehicles, wherein the operation thereof is significantly benefited or enhanced through the provision of an auxiliary, or alternate fuel supply such as, but not limited to, liquid natural gas (LNG), used in combination with an improved electronic control system.

For purposes of clarity and in order to further demonstrate the versatility of the mounting assembly of the present invention, it may be used on and operatively associated with a plurality of commercial vehicles including, but not limited to, the following:

Caterpillar Models: 797, 793, 789, 785, 777, 775, 773
Komtasu Models: HD1500-7, HD785-7, HD605-7, HD465-7, HD405-7, HD325-7
Terex Models: TR100, TR70, TR60, TR45, TR35

Hitachi Models: EH1700-3, EH1100-3

Euclid Models: R260, R220, R190, R170, R150, R130B, R130M, R130, R120E, R100, R90C, R90, R85B, R85, R65C, R65

The mounting assembly of the present invention comprises a containment structure for the fuel supply (LNG) in the form of at least one or a plurality of at least two fuel tanks. Each of the one or more fuel tanks stores the LNG or other fuel on the interior thereof during periods of non-use or operation of the vehicle. The mounting assembly further includes a housing structured to at least partially enclose the one or more fuel tanks on the interior thereof. A base is mounted on the vehicle in supporting relation to both the housing and the containment structure or fuel tanks. Therefore, the containment structure is at least partially enclosed and accordingly protected against unintended impact or contact by other objects, vehicles, etc. in the working environment of the vehicle on which the fuel supply and containment structure are disposed.

A shield assembly is disposed exteriorly of the containment structure or fuel tanks, in at least partially protective, covering relation thereto, and within or as an integrated part of the housing. Further, the shield assembly comprises one or more shield plates protectively disposed on the interior of the housing and exteriorly of the fuel tanks. Moreover, the one or more shield plates are configured to at least partially correspond to the fuel tanks and are structured of a rigid, heavy duty, high impact resistant material. Such material may include steel plate or other appropriate material capable of providing the sufficient protection of the containment assembly. The disposition and configuration of the one or more shield plates at least partially surrounds and encloses the one or more fuel tanks, so as to further facilitate the protection thereof, by eliminating or significantly restricting the possibility of a damaging impact being directed on the containment structure of the fuel supply.

The base including the operative components associated therewith may include a connecting assembly movably interconnected between the frame or other portion of the vehicle and the housing. Due to the operative features of the connecting assembly, the housing may be selectively disposed between a first orientation and a second orientation relative to at least a portion of the base and the vehicle. Accordingly, when the housing is in either the first or second orientation it is still mounted on and supported by the base and may be selectively positioned in the first or second orientations, at least partially dependent on the fuel supply and/or fuel tanks being operatively connected to the engine of the vehicle. The aforementioned connecting assembly comprises at least one but preferably a plurality of hinge structures movably interconnecting the housing to the vehicle and structured to pivotally dispose the housing into and out of said first and second orientations. The connecting assembly, including the one or more hinge structures may be connected directly to the vehicle adjacent to or in otherwise cooperative relation to the base.

Dependent on the practical application of the mounting assembly, the connecting assembly may be considered a part of the base or independent thereof, at least partially due to the relative and cooperative disposition and function of the connecting assembly and base. More specifically, the connecting assembly, along with at least a portion of the remainder of the base, will serve to support the housing at least when the housing is in the second orientation and at least partially support the housing when it is in either the first or second orientation. As set forth in greater detail hereinafter, the remainder of the base comprises a plurality of support legs collectively disposed in supporting relation to the housing and attached in supported relation on an appropriate portion of the vehicle.

Additional features of the housing include a stabilizing assembly disposed on the interior thereof in confronting relation to the one or more fuel tanks defining the containment structure. As such, the stabilizing assembly comprises at least one but more practically a plurality of stabilizing members disposed in spaced relation to one another and collectively extending along and confronting a length of the containment structure. Moreover, the one or more stabilizing members include a recessed configuration which at least partially corresponds to the exterior dimension and configuration of the fuel tanks. As a result, a confronting relation between the stabilizing members and the fuel tank(s) serve to restrict movement of the fuel tanks within the interior of the housing during travel or operation of the vehicle, whether the housing and fuel tanks are in the aforementioned first or second orientations.

In addition to the above, the mounting assembly of one or more preferred embodiments of the present invention includes a brace disposed in supporting relation to the housing substantially between the housing and the base, at least when the housing is in the first orientation. As such, the brace is connected to the housing and movable therewith as the housing and containment structure of the fuel supply is disposed between the first and second orientations. In cooperation therewith, a retaining assembly may be both movably and removably interconnected between the base and the housing and more specifically serves to at least partially support and interconnect the brace to the base, at least when the housing is in the second orientation. Moreover, the retaining assembly comprises at least one but preferably a plurality of at least two retaining arms which are disposed in interconnecting relation between the brace and the base in a manner which maintains and removably secures the housing in the second orientation relative to the base and vehicle on which the mounting assembly is disposed.

Therefore, the structural and operative features of the mounting assembly of the present invention is capable of supporting a fuel supply such as, but not limited to, an auxiliary fuel supply including a containment structure therefore on any of a variety of vehicles, such as of the type set forth above. The auxiliary fuel defining the fuel supply may be liquid natural gas (LNG) or other appropriate fuel compositions which may be utilized in combination with a more conventional distillate fuel. Such conventional fuel may include diesel fuel commonly used in extremely large mine-hauled vehicles, bulldozers or other working class vehicles.

Also, when the mounting assembly is disposed substantially on an exterior or at least partially exposed portion of the vehicle, the vehicle itself may be structurally modified or adapted to appropriately locate the accompanying fuel supply, containment structure, housing, base, etc. Further, when disposed, such as on a vehicle in the form of a bulldozer, the structural modification thereof may be such as to position the housing in a location which at least partially obstructs the view of the operator within the operator's cab or compartment area. In such instances, additional components may be utilized with the mounting assembly such as a camera or like viewing assembly operative to observe and transmit the obstructed view to a display assembly located within the operator's compartment or cab. This type of camera or like viewing assembly may be considered a part of the mounting assembly and/or may be located independently of the housing, base, etc. in a location which best facilitates the observance of the area obstructed from normal viewing by the operator.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 9A is a perspective view in partial cutaway of an at least partially assembled housing of the mounting assembly of the present invention and associated components of the base.

FIG. 9B is a detailed view of the indicated portion of FIG. 9A.

FIG. 9C is a detailed view of the indicated portion of FIG. 9A, wherein cooperative structural components associated with the retaining assembly and base are represented in at least partially assembled form.

Like reference numerals refer to like parts throughout the several views of the drawings.

DETAILED DESCRIPTION OF THE PREFERRED EMBODIMENT

Figure 1:
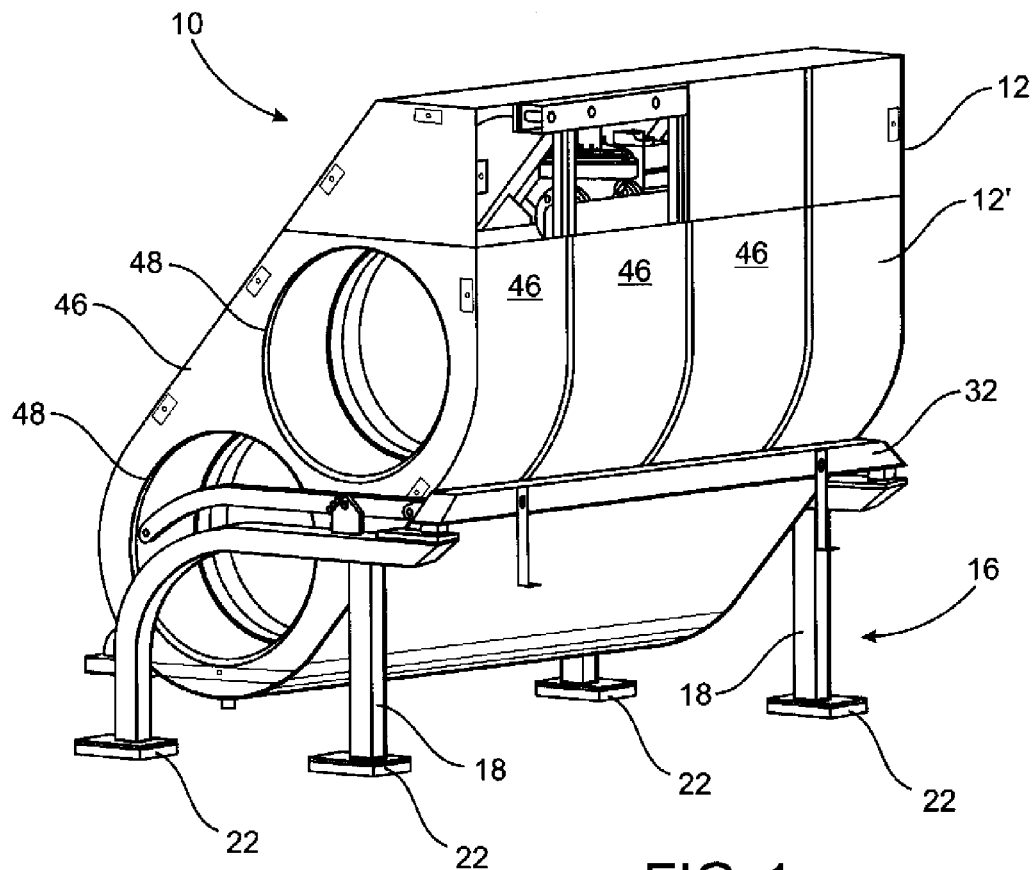
FIG. 1 is a rear perspective view in at least partially schematic form of the mounting assembly of the present invention, wherein the housing thereof is in a first orientation.
Figure 4A:
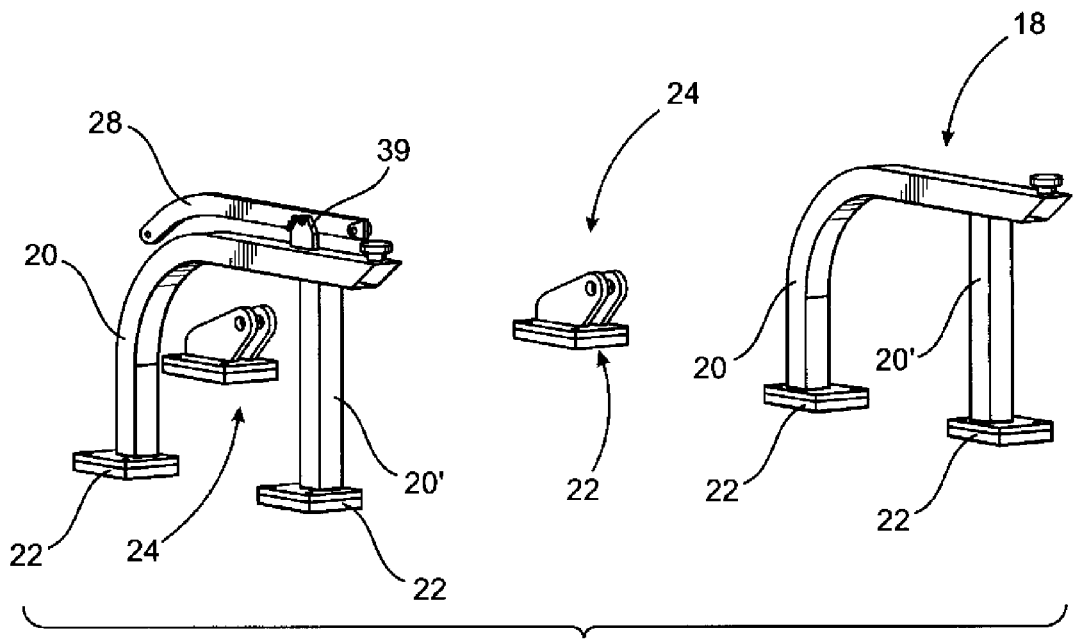
FIG. 4A is a composite view showing various structural components of a base of the embodiment of FIGS. 1-3.

As shown in the accompanying drawings, the present invention is directed to a mounting assembly generally indicated as 10 for supporting and movably interconnecting a housing generally indicated as 12 to a vehicle. The mounting assembly 10 is specifically, but not exclusively, intended for use on a heavy duty "mine haul" vehicle, bulldozer or other vehicle especially of the type used in heavy duty commercial and/or working environments. The housing 12 is structured to include a fuel supply disposed within a containment structure, wherein the containment structure comprises at least one but in certain practical applications, a plurality of at least two fuel tanks 14. However, it is emphasized that more than two fuel tanks can be included in the housing 12 of the mounting assembly 10. As also represented, the housing 12 is supported and interconnected to the vehicle by means of a base assembly, generally indicated as 16. With primary reference to FIGS. 1-4B, the base 16 includes a plurality of support legs 18 each of which include leg segments 20 and 20' having the lower end thereof fixedly secured, such as by welding the accompanying mounting pads 22 to the frame or other appropriate portion of the vehicle, on which the mounting assembly 10 is disposed.

Figure 2:
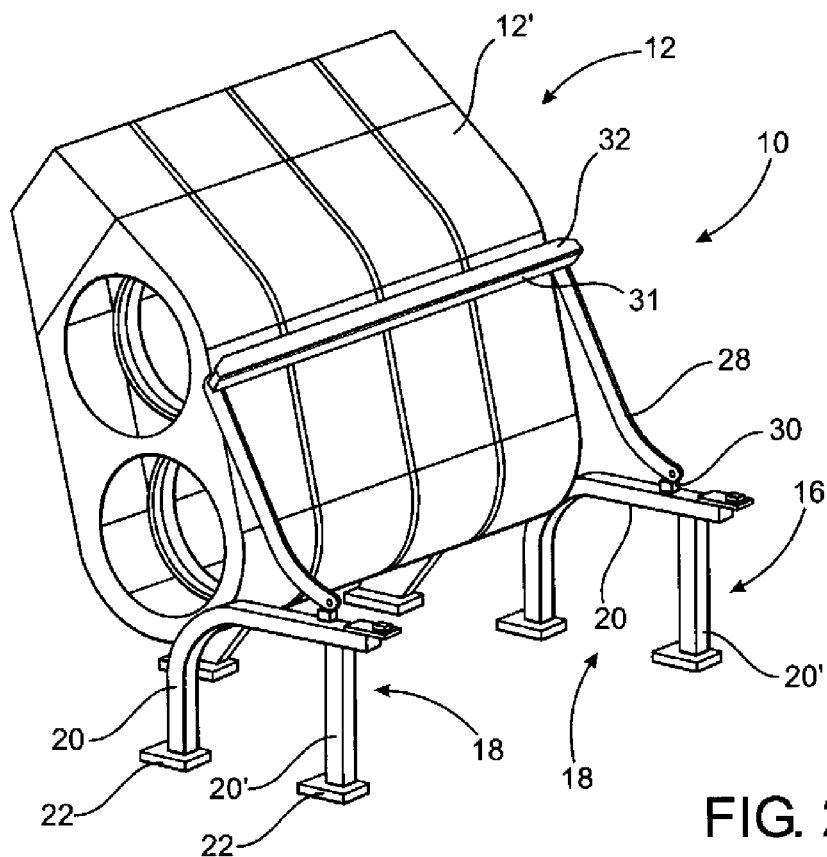
FIG. 2 is a rear perspective view of the embodiment of FIG. 1 wherein the housing is in a second orientation.
Figure 3:
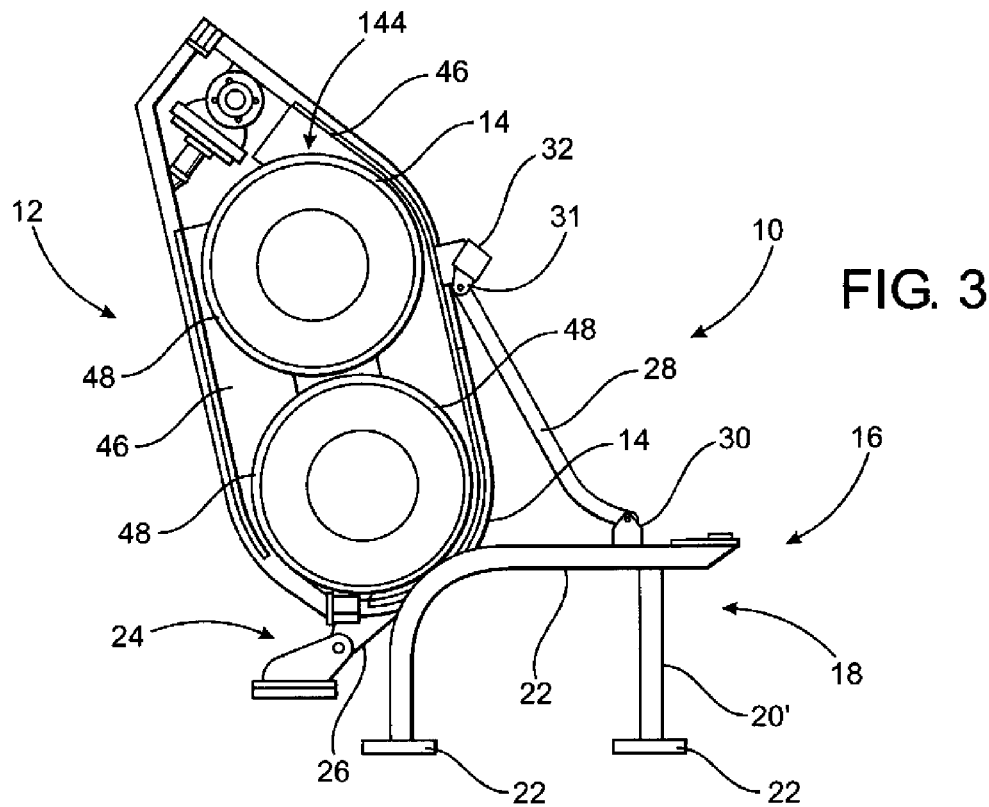
FIG. 3 is a side view of the embodiment of FIG. 2.
Figure 5:
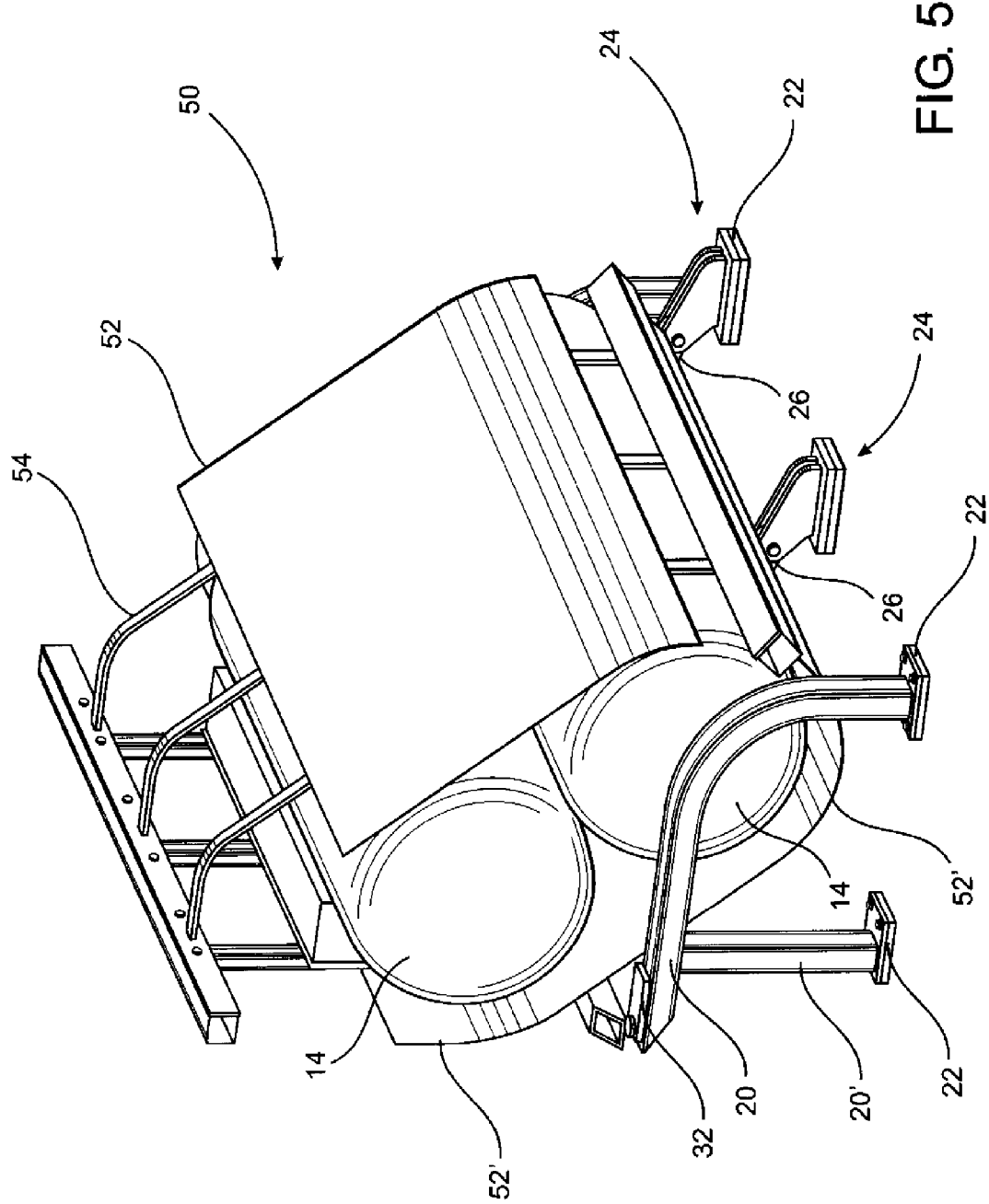
FIG. 5 is a front perspective view of the embodiment of FIGS. 1-3 wherein the housing is in at least partially assembled form providing interior details of a shield assembly associated with the housing.

The base 16 may also include a connecting assembly comprising at least one but in certain practical applications a plurality of at least two hinge structures generally indicated as 24. Each of the hinge structures 24 are connected to an appropriate link 26 or like structure secured to an under portion of the housing 14 as clearly represented in FIG. 3. The structural and operative features of each of the one or more hinge structures 24 is such as to facilitate the selective positioning or movement of the housing as well as the containment structure or fuel tanks 14 between a first orientation, as represented in FIGS. 1 and 5, and a second substantially upright orientation, as represented in FIGS. 2 and 3. Accordingly, the connecting hinge structures 24 serve to movably interconnect the housing 12 to the vehicle and further serve to support the housing 12 at least when the housing is in the second orientation of FIGS. 2 and 3. The disposition of the hinge structures 24 also add to the support of the housing 12 when it is in the first orientation, as clearly represented in FIGS. 1 and 5. The one or more hinge structures 24 may be considered a part of the base 16 due to their support of the housing 12 when at least in the second orientation and most probably when in both the first and second orientations. However, dependent upon the structure, configuration and dimension of the vehicle on which the mounting assembly 10 is disposed, the one or more hinge structures 24 may be considered independent of the base 16 by virtue of their location being not directly adjacent to or operatively associated with the base 16.

Further with regard to the selective positioning of the housing 12 in either the first or second orientations, the mounting assembly 10 further includes a retaining assembly comprising at least one, but preferably a plurality of at least two retaining arms or bars 28. The one or more retaining arms 28 serve to maintain and at least partially support the housing 12, at least when it is in the second orientation as clearly demonstrated in FIGS. 2 and 3, when the one or more retaining arms 28 are in their operative position. Each of the retaining arms 28 include opposite ends removably connected, as at 30, to the correspondingly disposed support arm 18. The opposite end of each of the retaining arms 28 is removably connected, as at 31, to the housing 12 and more specifically to a brace or cross brace structure 32.

Figure 9:
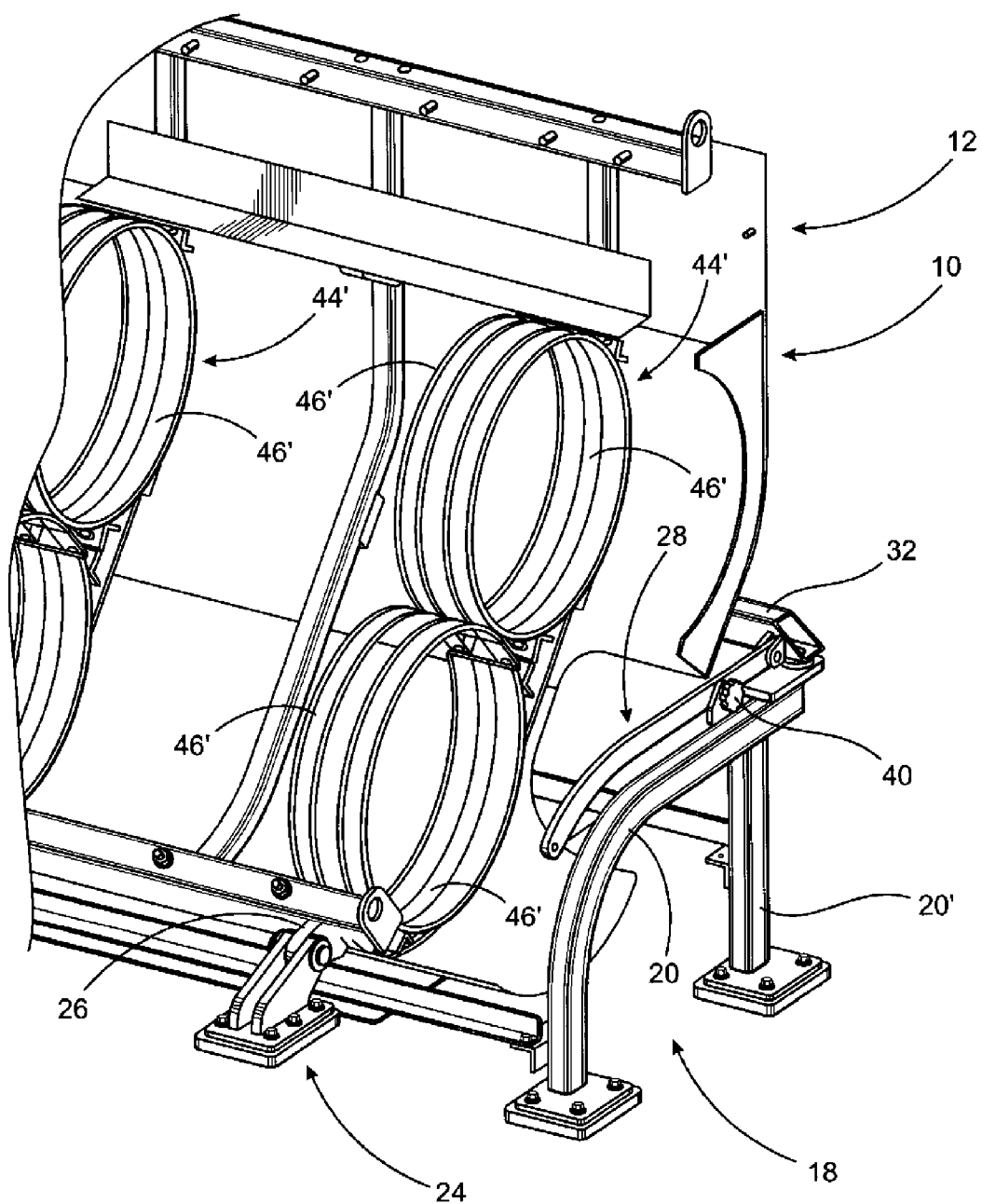
FIG. 9 is a perspective view in partial cutaway and in schematic form of additional structural components associated with the housing, base and structural components associated therewith.

With primary reference to FIGS. 9-9C, additional structural and operative features associated with the retaining assembly and specifically including each of the retaining arms 28 are represented. More specifically, when the housing 12 is in the first orientation, the retaining arms 28 are in a stored position or location as demonstrated in FIG. 9. Each of the arms 28 are maintained in such a stored position by being removably locked or secured to corresponding support arms 18 by virtue of an assembly 34, represented in FIGS. 9A-9C. The assembly 34 includes a pair of spaced apart flanges or ears 35 each having apertures 36, disposed in aligned relation with one another. A connecting bolt or like member 37 passes through the aligned apertures 36 in each of the spaced apart ears 35 and also through an apertured end 31' of the corresponding retaining arm 28. As such, each of the retaining arms 28 is maintained in the stored or non-supporting orientation on an upper or top portion of the support leg segment 20. However, when the housing 12 is selectively disposed in the second orientation as represented in FIGS. 2 and 3, the end 31' of each of the retaining arms 28 are removed from the assembly 34 and in turn removably connected to correspondingly disposed portions of the brace 32 as also clearly represented in FIGS. 2 and 3.

Figure 8:
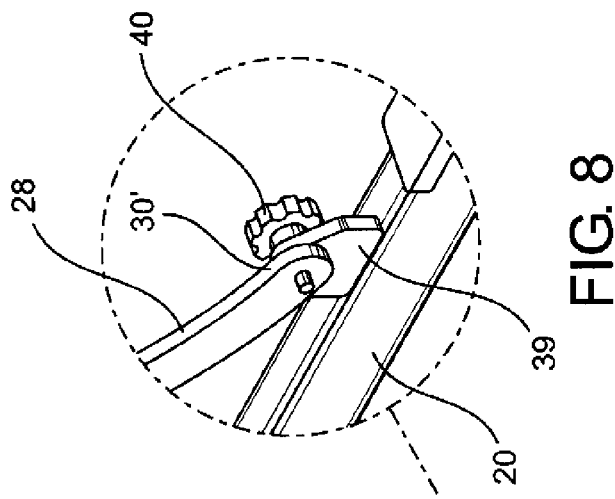
FIG. 8 is a detailed view of an indicated portion of the embodiment of FIG. 7.
Figure 7:
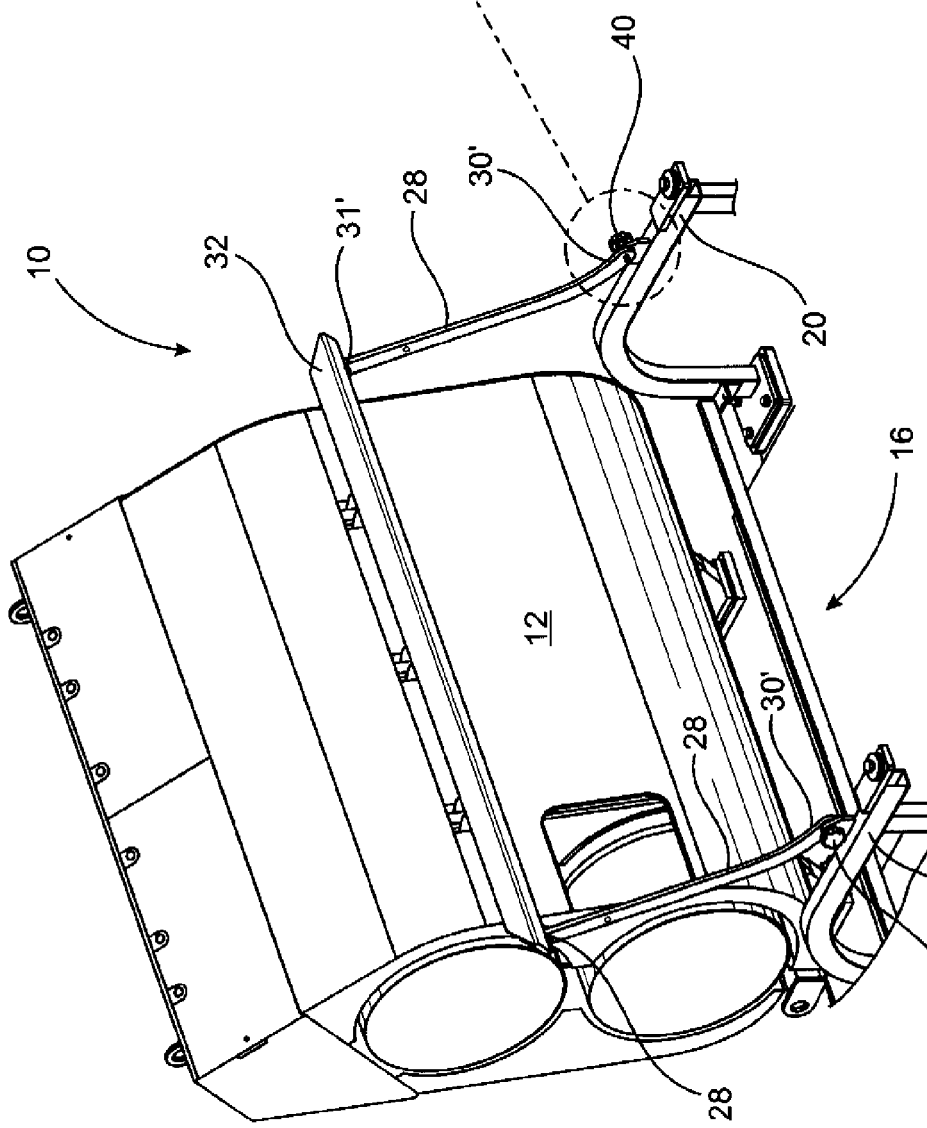
FIG. 7 is a rear perspective view in partial cutaway of the housing, base, and retaining assembly associated with at least one preferred embodiment of the mounting assembly as generally represented in FIGS. 1-6.

Moreover, each of the retaining arms 28 are removed from the stored orientation, as represented in FIG. 9 and disposed in the supporting orientation of FIGS. 2 and 3. When in such a supporting orientation, the opposite end 30 is removably connected to the upstanding connecting flange 39, by a threaded knob 40 or like connector, as clearly represented in FIGS. 7 and 8. The removable but stable interconnection of the opposite ends 30 and 31, as at 30' and 31', to the mounting flange 39 and the base 32, respectively, will serve to assure that the retaining arms 28 are maintained in their operative, supporting, retaining position between the base 16 and the housing 12 and/or brace 32. However, the removable interconnection of each of the retaining arms 28 in their supporting, retaining position facilitates the easy disconnection of the retaining arms 28 for selective disposition in their stored orientation in order to dispose the housing 12 in the first orientation, as described above.

Figure 4B:
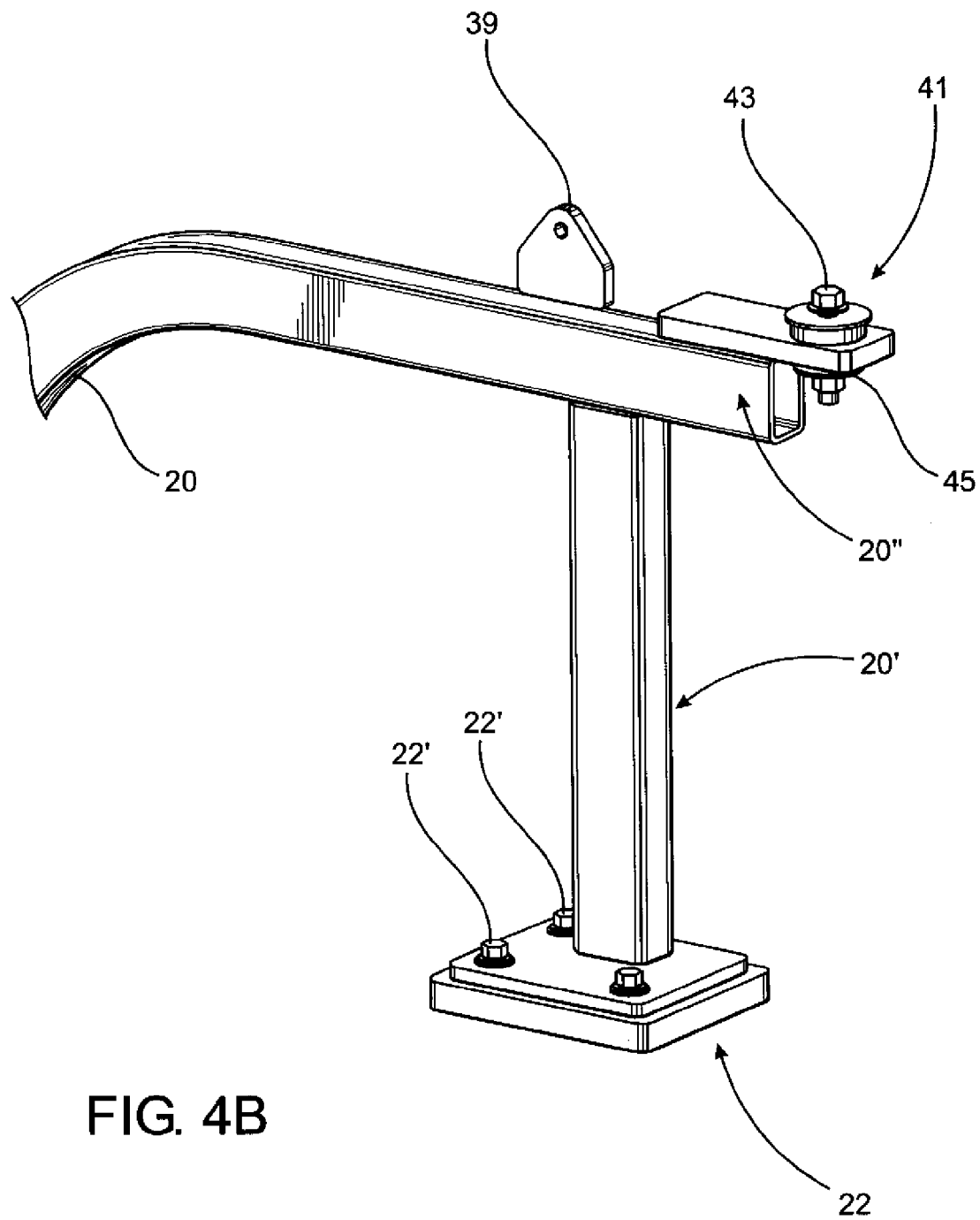
FIG. 4B is a detailed view in partial cutaway of one of a plurality of support legs, as well as structural components associated therewith, at least partially defining the base.

As should be apparent, the stability of the housing 12 as well as the plurality of fuel tanks 14 contained on the interior thereof is important. Accordingly, the maintenance of the housing 12 in the first orientation of FIG. 1 is facilitated by a removable but stable attachment assembly 41 associated with the distal portion of each of the support leg segments 20, as best represented in FIG. 4B. The removable connecting bolt or like connector 43 may include a spring loaded attachment as at 45 and may be further structured to removably interconnect the opposite ends of the brace 32 to the distal ends of the support leg segment 20 as at 20". The spring loaded feature of the attachment assembly 41 will further serve to dampen any abrupt movement and/or vibration being transferred to the housing 12 and to the fuel tanks 14. It is therefore assured that the housing 12 is maintained in the first orientation by virtue of the brace 32 being fixedly connected to the housing 12 and movable therewith as demonstrated in FIGS. 1-3.

The stability of the containment structure, comprising the one or more fuel tanks 14 within the interior of the housing, is further enhanced by a stabilizing assembly 44 also at least partially disposed on the interior of the housing. The stabilizing assembly 44 includes at least one but preferably a plurality of stabilizing members 46 disposed in spaced relation to one another and collectively extending along the length of the one or more fuel tanks 14 defining the containment structure for the fuel supply. In addition, the stabilizing members 46 may be disposed on opposite sides of fuel tanks 14. In addition, each or at least some of the stabilizing members 46 include a recessed segment or portion 48 at least partially dimensioned and configured to the corresponding exterior configuration of each of the fuel tanks 14. As such, the plurality of stabilizing members 46 can be defined as collectively and at least partially surrounding and/or "sandwiching" the plurality of fuel tanks 14 there between. By virtue of this cooperative disposition and structure, movement or inadvertent, unintended displacement of the one or more fuel tanks 14 within the interior of the housing 12 is eliminated or significantly restricted. In addition, the stabilizing assembly 46 can be defined by a plurality of the stabilizing members 48 which may vary in number, size, configuration, etc. so as to accommodate a confronting engagement or relation with the one or more fuel tanks 14 in a manner which facilitates the ability to restrict the displacement or movement of the fuel tanks 14 within the interior of the housing 12, whether the housing 12 is in either the aforementioned first or second orientations.

With reference to FIG. 9, an alternate embodiment of the stabilizing assembly is generally represented as 44'. As there represented, the plurality of stabilizing members 46' are disposed in spaced relation to one another and include a generally annular or circular configuration of sufficient dimension to at least partially surround correspondingly dispose ones of the fuel tanks 14. Further, the stabilizing members 46' may be segregated from one another at opposite ends so as to facilitate the stable positioning of the fuel tanks 14, on the interior of the cooperatively disposed stabilizing segments 46'.

Figure 6:
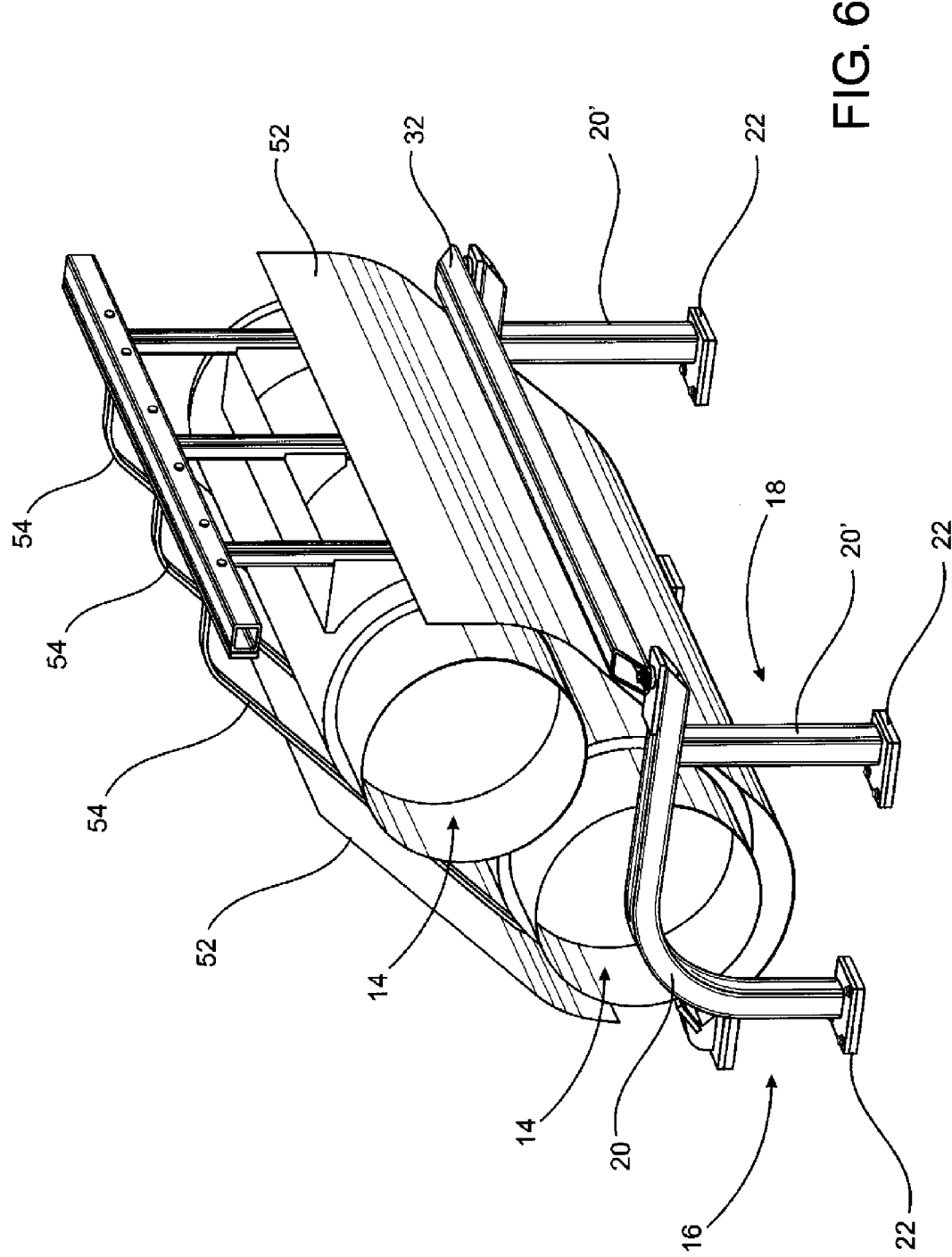
FIG. 6 is a side perspective view of the embodiment of FIG. 5 in at least partially assembled form showing additional structural features of the housing and associated shield assembly.

As set forth above, the mounting assembly 10 is structurally and operatively adaptable for the mounting, and support of an auxiliary fuel supply and as such, may be mounted on exterior portions of the vehicle with which it is associated. Accordingly, as represented in FIGS. 5 and 6, the housing 12 further includes a shield assembly generally indicated as 50. Shield assembly 50 includes at least one but more practically a plurality of shielding plates 52, which are formed of a metallic or other rigid, impact resistant material. Further, each of the shield plates 52 are cooperatively disposed and configured to at least partially enclose and/or overlie normally exposed portions of the fuel tanks 14, while they are maintained on the interior of the housing 12. In addition, each of the shield plates 52 is also disposed at least partially on the interior of the housing 12, such as by being associated with or integrated within corresponding side walls 12'. Positioning and further reinforcement of the housing may be accomplished through the provision of a plurality of mounting or supporting ribs 44, which also may be associated with the side walls 12' of the housing 12 so as to maintain the shield plates 52 in their protective position relative to the fuel tanks 14. The corresponding configuration of the shield plates 52 may include curved or partially bent segments thereof as at 52', wherein such curvilinear segments may at least partially correspond to the exterior configuration of the fuel tanks. In addition, the structure, disposition, configuration and size of each of the one or more shield plates 52 is made to cooperate with or correspond to the plurality of stabilizing members 46 and/or 46' in a manner which further facilitates the protection and stable retaining of the fuel tanks 14 within the interior of the housing.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An assembly for mounting a fuel supply on a vehicle, said assembly comprising:
  a containment structure for the fuel supply and a base connected to said containment structure in supporting relation thereto,
  a housing structured to at least partially enclose said containment structure on an interior thereof,
  said housing movably connected to said base and selectively disposable, along with said containment structure, between a first orientation and a second orientation relative to said base and the vehicle, a shield assembly disposed exteriorly of and in at least partially protective relation to said containment structure, and said base structured to support said housing and said containment structure in both said first and second orientations.

2. An assembly as recited in claim 1 wherein said shield assembly is at least partially integrated into an exterior wall portion of said housing.

3. An assembly as recited in claim 2 wherein said shield assembly comprises at least one shield plate formed from a rigid, heavy duty, impact resistant material.

4. An assembly as recited in claim 3 wherein said at least one shield plate is configured to at least partially correspond to said containment structure and is disposed in at least partially surrounding relation thereto.

5. An assembly as recited in claim 1 further comprising a stabilizing assembly disposed within said housing in confronting relation to said containment structure; said stabilizing assembly disposed and structured to restrict movement of said containment structure within said housing.

6. An assembly as recited in claim 5 further comprising at least one fuel tank at least partially defining said containment structure; said stabilizing assembly disposed and configured to at least partially surround said one fuel tank.

7. An assembly as recited in claim 6 wherein said stabilizing assembly comprises a plurality of stabilizing members disposed in spaced relation to one another within said housing and collectively extending along and confronting a length of said at least one fuel tank in movement restricting relation thereto.

8. An assembly as recited in claim 5 further comprising at least two fuel tanks defining said containment structure; said stabilizing assembly disposed and configured to at least partially surround and contain each of said two fuel tanks.

9. An assembly as recited in claim 8 wherein said stabilizing assembly comprises a plurality of stabilizing members collectively disposed on substantially opposite sides of said two fuel tanks; said plurality of stabilizing members collectively including a plurality of recessed portions disposed and dimensioned to at least partially receive and contain said at least two fuel tanks therein.

10. An assembly as recited in claim 1 further comprising a brace disposed in supporting relation to said housing between said housing and said base, when said housing is in said first orientation.

11. An assembly as recited in claim 10 wherein said brace is connected to said housing and movable therewith between said first and second orientations.

12. An assembly as recited in claim 11 wherein said brace comprises an elongated configuration extending along a length of said housing, said brace removably secured to said base when said housing is in said first orientation.

13. An assembly as recited in claim 10 further comprising a retaining assembly movably and removably interconnected between said base and said brace, when said housing is in said second orientation; said retaining assembly structured to maintain said housing in said second orientation.

14. An assembly as recited in claim 1 further comprising a retaining assembly movably and removably interconnected between said housing and said base, when said housing is in said second orientation, said retaining assembly structured to removably retain said housing in said second orientation.

15. An assembly as recited in claim 14 wherein said retaining assembly comprises at least one retaining arm movable relative to said base and selectively positioned in interconnecting relation between said base and said housing, when said housing is in said second orientation.

16. An assembly as recited in claim 14 wherein said retaining assembly comprises a plurality of retaining arms each disposed in removable, interconnecting relation between said base and said house, said plurality of retaining arms collectively structured to retain said housing in said second orientation.

17. An assembly as recited in claim 1 further comprising a connecting assembly disposed and structured to movably and at least partially interconnect said housing to the vehicle; said connecting assembly operable to facilitate disposition of said housing between said first and second orientation.

18. An assembly as recited in claim 17 wherein said connecting assembly is disposed in supporting relation to said housing at least when said housing is in said second orientation.

19. An assembly as recited in claim 18 wherein said connecting assembly is disposed and structured to define at least a portion of said base.

20. An assembly as recited in claim 17 wherein said connecting assembly comprises at least one hinge movably interconnecting said housing to the vehicle and structured to pivotally dispose said housing into and out of said first and second orientations.

21. An assembly as recited in claim 17 wherein said connecting assembly comprises a plurality of hinge structures movably interconnecting said housing to the vehicle and collectively structured to pivotally dispose said housing into and out of said first and second orientations, said plurality of hinge structures disposed to collectively support said housing at least when in said second orientation.

22. An assembly as recited in claim 1 wherein said base comprises a plurality of support legs collectively disposed in supporting relation to said housing and in spaced relation to one another.

23. An assembly as recited in claim 22 wherein said base further comprises a connecting assembly disposed and structured to movably interconnect said housing to the vehicle and operable to facilitate disposition of said housing between said first and second orientations.

24. An assembly as recited in claim 23 wherein said connecting assembly is disposed in supporting relation to said housing at least when said housing is in said second orientation.

25. An assembly for mounting a fuel supply on a vehicle, said assembly comprising:

a containment structure comprising at least one fuel tank structured to contain the fuel supply therein, a base connected in supporting relation to the at least one fuel tank, a housing structured to contain the at least one fuel tank on an interior thereof, a connecting assembly disposed and structured to movably interconnect said housing to the vehicle and operable to facilitate disposition of said housing and the at least one fuel tank between a first orientation and a second orientation relative to said base and the vehicle, a shield assembly integrated into said housing and disposed exteriorly of and in at least partially protective relation to said at least one fuel tank, said connecting assembly disposed in supporting relation to said housing at least when the housing is in said second orientation, a stabilizing assembly disposed within said housing in confronting relation to the at least one fuel tank, said stabilizing assembly disposed and structured to restrict movement of said at least one fuel tank within said housing, and a retaining assembly movably and removably interconnected between said base and said housing, said retaining assembly disposed and structured to removably retain said housing in said second orientation.

\* \* \* \* \*